Aug. 14, 1945.　　　G. D. EBBETS　　　2,381,890
METHOD OF FORMING LINED PRESSURE VESSEL CONNECTIONS
Filed June 13, 1942
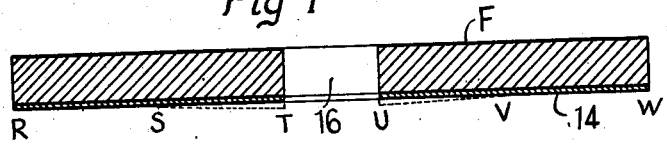
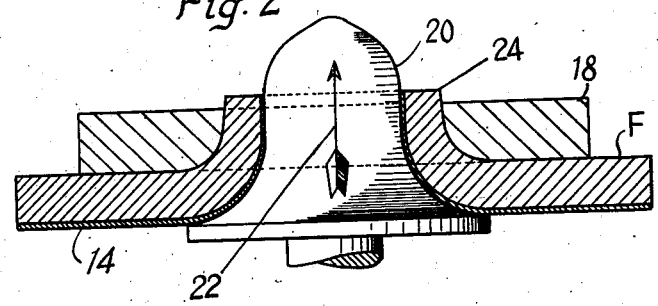
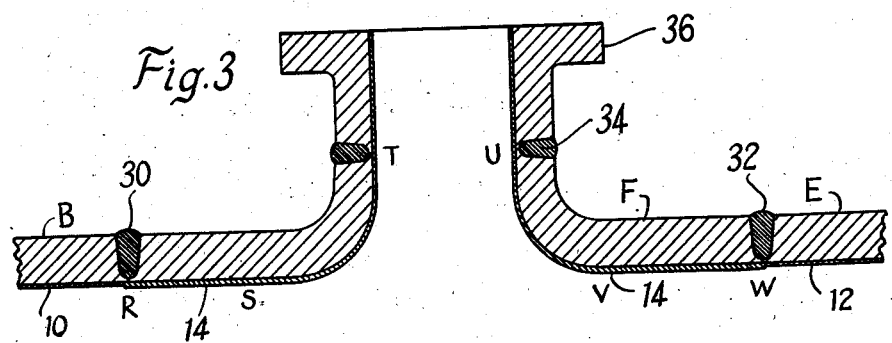
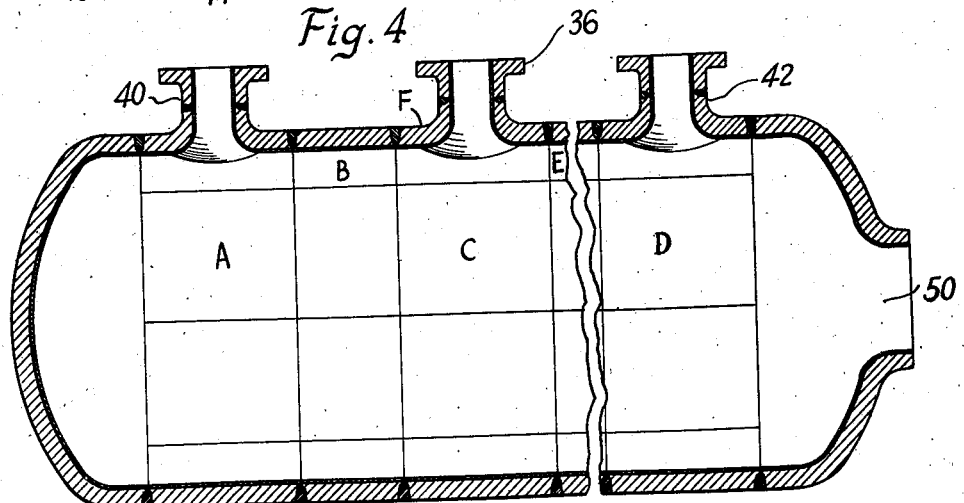
INVENTOR.
George D. Ebbets
BY
Attorney Patented Aug. 14, 1945

2,381,890

UNITED STATES PATENT OFFICE 2,381,890

METHOD OF FORMING LINED PRESSURE VESSEL CONNECTIONS

George D. Ebbets, Kenilworth, N. J., assignor to The Babcock & Wilcox Company, Jersey City, N. J., a corporation of New Jersey Application June 13, 1942, Serial No. 446,943

3 Claims. (Cl. 29—148.2)

This invention relates to pressure vessels, and is more particularly concerned with the manufacture of pressure vessels which have relatively thin linings of corrosion resistant metal bonded to the thick base plate of the vessel.

In the fabrication of such vessels it is important to provide corresponding corrosion resistant linings for inlet or outlet nozzles or similar structures, but when the latter are formed by fluing or extruding an opening in an initially clad or composite plate member forming the adjacent wall portion of the vessel, a thinning of the corrosion resistant layer below a satisfactory thickness, or a separation of the lining and the base, is apt to occur.

It is an object of the invention to prevent such undesirable results and to provide a method of manufacturing whereby a nozzle or similar connecting structure is formed from clad plate, in a manner to insure a predetermined minimum thickness of the corrosion resistant layer lining the nozzle.

The invention will be more clearly understood from the following description, and other objects of the invention will appear as the description proceeds.

The invention will be described with reference to the accompanying drawing which is to be considered for illustrative purposes.

In the drawing:

Fig. 1 is a section of a clad nozzle plate utilized in the illustrative method;

Fig. 2 is a view illustrating the forging of the clad nozzle plate;

Fig. 3 is a sectional view of a pressure vessel nozzle construction, showing an additional step in the method of manufacture, and indicating a modification of the Fig. 1 method; and Fig. 4 is a horizontal section of the completed pressure vessel having a plurality of the illustrative nozzle connections.

The pressure vessel is formed from a plurality of clad plates each of which includes a thin layer of corrosion resistant metal.

The clad plates may be constructed in the manner indicated by the assignee's Trainer and Hodge patent—2,214,002, dated September 10, 1940, this method resulting in the unitary plate structure in which the cladding metal is integrally united with the thick base plate.

Such clad metal plates form the drum sections A, B, C, D, E, indicated in Fig. 4 of the drawing, the cladding of the plates B and E also being indicated at 10 and 12 in Fig. 3.

The illustrative method also includes the formation of a nozzle plate F with a cladding layer 14 of a thickness to afford adequate corrosion resistance.

After the clad plates are prepared they are formed to pressure vessel contour so that they may be subsequently welded together along the lines indicated in Fig. 4 to constitute the completed pressure vessel.

By fabrication of the nozzle plate "F" with a corrosion resistant layer 14 of graduated thickness, the entire interior surface of the ultimate nozzle structure may have a corrosion resistant lining of uniform thickness. To accomplish this the corrosion resistant layer may be formed so that at its periphery the thickness of the layer is substantially the same as that for the adjoining sections B and E of the pressure vessel. For instance, at such points as R and W in Fig. 1 of the drawing the thickness of the corrosion resistant lining can be the same as that for the adjoining pressure vessel sections and this thickness may be maintained inwardly of the inner surface of the nozzle plate up to positions where the original lining thickness is reduced by the subsequent nozzle forming operations. The reference characters S and V in Fig. 1 are intended to indicate such positions. From these positions and toward the center of the nozzle plate the lining may be of gradually increasing thickness to such points as those indicated at T and U in Fig. 1.

When the composite nozzle plate is fabricated in this manner the entire interior surface of the completed nozzle may have a corrosion resistant lining of uniform thickness which may be of the order of the thickness of the linings 10 and 12 of the pressure vessel sections B and E.

After the nozzle plate F is fabricated with its corrosion resistant lining, it is drilled to provide such an opening as that indicated at 16 in Fig. 1, and thereafter it is formed to pressure vessel contour. It is then heated to a forging temperature, and while at a temperature in the forging range, it is subjected to the metal extruding action of the dies or forging members 18 and 20. The forging action causes the metal of the plate F adjacent the opening 16 to flow in the direction of the arrow 22. This action results in the formation of the nozzle 24 with an attendant thinning of the cladding layer in the forging zone. The member 18 is held stationary and the member 20 moved in the direction of the arrow 22 to exert pressure against the lining and toward the base to which it is bonded. With this direction of the forging pressure, there is a tendency to avoid or offset any tendency to disrupt the bond between the corrosion resistant lining and the base plate.

I have found that when so forming a nozzle plate to provide a nozzle of 8" I. D. that the original cladding layer thickness of 5/64" may be reduced to a lesser thickness of 3/64" at the 8" diameter portion. Such a reduced thickness does not provide the corrosion resistance of the main portion of the vessel where a thickness of 5/64" is maintained, and, in order to maintain such minimum of corrosion resistance, I therefore make the cladding of the unformed nozzle portion F of 7/64" thickness and thereby the finished nozzle will have a corrosion resistant lining of at least 5/64".

Subsequent to the forging operation, the nozzle section F is finished at its edges to provide portions of weld grooves for the circumferential welds 30 and 32 which unite adjacent plates 10 and 12 with the nozzle plate F, and to partially provide for the grooves for the weld 34 which unites the flanged nozzle member 36 with the nozzle 24.

The illustrative procedure provides a method by which nozzle connections may be effectively formed while maintaining an adequate thickness of the cladding metal for the nozzles.

Fig. 3 illustrates a pressure vessel nozzle in which the cladding of the nozzle plate is thicker than the cladding of other pressure vessel sections with the thicker cladding compensating for the thinning down of the cladding in the manufacture of the nozzle, so that there will nowhere exist insufficient protection against corrosion.

The pressure vessel indicated in Fig. 4 includes additional nozzle connections 40 and 42 constructed in the manner above indicated, and it is to be understood that the expression "nozzle" or "nozzle connection" is to be taken in an illustrative sense and not in any sense as an expression of limitation. For instance, structures providing access openings such as that indicated at 50 in Fig. 4 may also be constructed by the illustrative method.

While the invention has been described with reference to the structure shown in the drawing, and with reference to the specific method indicated, it is to be understood that the invention is not limited to all the details thereof. It is rather to be considered as of a scope commensurate with the scope of the sub-joined claims.

What is claimed is:

1. In the manufacture of a pressure part, fabricating a thick base plate with a relatively thin stratum of corrosion resistant metal integrally bonded thereto and of increased thickness over a part of the composite plate for ultimately forming a tubular connection, forging said part of said composite plate about an opening therein by pressure exerted against the lining and toward the base plate to form a tubular upstanding connection, the increased thickness of the liner stratum in the zone of forging compensating for the thinning of the lining involved in the forging operation, the thickness of the lining over the forging zone being such that the ultimate thickness of the liner of the tubular section is not less than the thickness of the liner of the unforged part of the composite plate.

2. In the manufacture of pressure vessels, fabricating clad plates at least one of which constitutes a nozzle plate having a cladding metal of increased thickness, forming the clad plates to pressure vessel contour, drilling the nozzle plate at a nozzle position, and hot forging the nozzle plate by a metal extruding action through the drilled opening and from the clad side of the plate toward the unclad side, said extruding action causing an enlargement of the drilled opening and a thinning of the clad metal of the nozzle plate adjacent the opening, said thinning of the clad metal in the formation of the nozzle leaving the nozzle lining at least as thick as the cladding of the plates other than the nozzle plate.

3. In the manufacture of pressure vessels, fabricating clad plates at least one of which constitutes a nozzle plate having a cladding metal of greater thickness, forming the clad plates to pressure vessel contour, drilling the nozzle plate at a nozzle position, further forming the nozzle plate by a forging action through the drilled opening and from the clad side of the plate toward the unclad side, said forging action causing an enlargement of the drilled opening and a thinning of the clad metal of the nozzle plate adjacent the opening, and welding the clad plates at their fitting edges to form a pressure vessel, said thinning of the clad metal in the formation of the nozzle leaving the nozzle lining at least as thick as the cladding of the plates other than the nozzle plate.

GEORGE D. EBBETS.